(12) United States Patent
Stecher et al.

(10) Patent No.: US 7,161,115 B2
(45) Date of Patent: Jan. 9, 2007

(54) MAGNETICALLY IMPELLED ARC BUTT WELDING OF PIPELINES

(75) Inventors: Gabriel Stecher, Carboor East (AU); Allan Leigh Fletcher, Bright (AU)

(73) Assignee: Miab Technology Pty Ltd, Bright (AU)

( * ) Notice: Subject to any disclaimer, the term of this patent is extended or adjusted under 35 U.S.C. 154(b) by 0 days.

(21) Appl. No.: 10/493,736

(22) PCT Filed: Oct. 25, 2002

(86) PCT No.: PCT/AU02/01455

§ 371 (c)(1),
(2), (4) Date: Aug. 16, 2004

(87) PCT Pub. No.: WO03/036153

PCT Pub. Date: May 1, 2003

(65) Prior Publication Data

US 2004/0265065 A1    Dec. 30, 2004

(30) Foreign Application Priority Data

Oct. 25, 2001 (AU) .................................... PR8479

(51) Int. Cl.
*B23K 9/08* (2006.01)
(52) U.S. Cl. ................... 219/123; 219/125.11
(58) Field of Classification Search ............. 219/60 R, 219/61, 123, 125.11
See application file for complete search history.

(56) References Cited

U.S. PATENT DOCUMENTS 3,882,299 A * 5/1975 Sciaky .................... 219/60 R
4,050,589 A * 9/1977 Dolza ..................... 414/745.6
4,591,294 A * 5/1986 Foulkes ................... 405/170
4,999,476 A * 3/1991 Kuchuk-Yatsenko et al. .... 219/123

FOREIGN PATENT DOCUMENTS

| DE | 2525990 | 12/1976 |
|---|---|---|
| DE | 2738618 | 3/1978 |
| DE | 19841812 | 3/2000 |
| FR | 2505226 | 5/1981 |
| GB | 2165780 | 4/1986 |
| WO | WO 00/43630 | 7/2000 |
| WO | WO 00/45986 A | 8/2000 |

* cited by examiner

*Primary Examiner*—Clifford C. Shaw
(74) *Attorney, Agent, or Firm*—Gordon & Jacobson, PC (57) ABSTRACT

The present invention is a method and a vehicle-mounted apparatus (30) for laying pipelines in which adjacent pipe (17, 28) are joined by the technique of magnetically impelled arc butt welding (MIAB). A MIAB welding head (13) having a welding axis is mounted on a transportable platform (35). A pipe guide (50) capable of engaging a welded pipe string is located rearwardly of the welding head (45). The pipe guide (50) maintains alignment of the string with the welding axis. The apparatus includes pipe feed means (47, 48, 49) maintaining alignment of a next pipe to be laid with the welding axis and the pipe string (17). The platform (37) is rotatably mounted on the vehicle (30) and tilts around a horizontal axis. The vehicle (300) is provided with pivoting steerable tracks (38).

25 Claims, 11 Drawing Sheets

MAGNETICALLY IMPELLED ARC BUTT WELDING OF PIPELINES

TECHNICAL FIELD

This invention relates to the laying of pipelines such as gas or oil pipelines, in which successive pipe sections are welded to form a string which is laid in a trench or other line of rest. The invention provides a method and apparatus for laying pipelines in which pipe sections are joined by the technique of magnetically impelled arc butt (MIAB) welding.

BACKGROUND ART

MIAB welding is a forge-welding process in which a welding arc is established in a gap between the parts to be welded, and the arc is moved by means of a magnetic field. In the MIAB welding of steel pipes, the square edged or otherwise prepared pipe ends to be welded are aligned axially and separated by a small gap, and a welding arc established in the gap. A magnetic field is then superimposed on the gap, causing the arc to rotate at high speed around the gap. After the ends are heated, they are pressed together causing plastic and molten metal present on the heated surfaces to be forced out of the joint, along with oxides and other impurities. A high quality weld is thus produced.

Although MIAB welding has been proposed for pipelines, prior art methods for its implementation have been found wanting.

SUMMARY OF THE INVENTION

In one aspect the invention includes an apparatus for magnetically impelled arc butt (MIAB) welding including a transportable platform, a MIAB welding head mounted on said transportable platform, said welding head having a welding axis, a pipe guide located rearwardly of said welding head and capable of engaging a welded pipe string to maintain alignment of said string with said welding axis, and pipe feed means maintaining alignment of a next pipe to be laid with the welding axis and the pipe string.

Preferably said apparatus further includes an outrigger means extending rearwardly of said platform, said pipe guide being mounted on said outrigger means.

Preferably the platform also includes means for the transfer of a pipe from a pipe supply to the pipe feed means, such feed means including an in-feed bed holding the next pipe to be welded in alignment with the welding axis and the welded string.

Preferably the pipe supply includes a pipe magazine mounted on said transportable platform.

The invention also resides in a pipe-laying vehicle including said transportable platform and a travelling body, said transportable platform being rotatably mounted on said travelling body, and having a substantially vertical axis of rotation.

Preferably said pipe-laying vehicle further includes pivotable mounting means for tilting said transportable platform relative to said travelling body.

Preferably said travelling body includes a tracked support having a direction of travel and said axis of tilt is perpendicular to said direction.

Preferably said travelling body includes at least a pair of tracks for respective sides of said body.

Preferably said travelling body further includes at least a set of auxiliary wheels spaced from said tracks for supporting said pipe-laying vehicle, each of said auxiliary wheels being rotatably mounted to a pivot arm thereby permitting movement of the auxiliary wheels.

In accordance with another embodiment of the invention, said pipe-laying vehicle includes a travelling body having a longitudinal axis, an undercarriage, a front pair of tracks and a rear pair of tracks, each said track being pivotally mounted to said undercarriage thereby permitting tilting movement of each track about an axis of tilt perpendicular to the longitudinal axis of said travelling body.

Preferably said longitudinal axis is parallel to the welding axis.

Preferably said pipe-laying vehicle includes at least a pair of steerable tracks and a steering mechanism operatively connected to said steerable tracks for steering the pipe-laying vehicle.

Preferably said pipe-laying vehicle includes means for differential movement of said tracks.

Preferably said transportable platform includes an end portion and a body portion, said end portion being hingedly attached to said body portion so as to be movable between an in-line configuration in which the portions are arranged substantially in line with each other along a longitudinal axis of said transportable platform and a folded configuration in which said portions are arranged in an overlaying relation with each other.

Preferably said end portion includes said outrigger.

Preferably said transportable platform includes an end portion and a body portion, said end portion being hingedly attached to said body portion so as to be movable between an in-line configuration in which the portions are arranged substantially in line with each other along a longitudinal axis of said transportable platform and a folded configuration in which said portions are arranged side by side parallel to the longitudinal axis of said transportable platform.

Preferably said pipe guide includes rollers acting to align said pipe string co-axially with the welding axis.

Preferably, each said roller has a profile substantially corresponding to the shape of said pipe string.

The invention also resides in a method of laying a pipeline including the steps of locating a mobile welding head in relation to the end of a laid pipe string, locating an end of a next pipe to be welded in alignment with said welding head and said string, welding said next pipe to the end of said string by magnetically impelled arc butt welding, moving said welding ha into position for the welding of the next pipe section thereby allowing laying of the extended pipe string.

BRIEF DESCRIPTION OF THE DRAWINGS

Preferred forms of the present invention will be described by way of example with reference to the accompanying drawings, wherein.

DETAILED DESCRIPTION OF THE PREFERRED EMBODIMENTS

Referring now to the drawings, there is illustrated in FIGS. 1–8 a pipe-laying vehicle 5 according to a first embodiment of the present invention.

Figure 1:
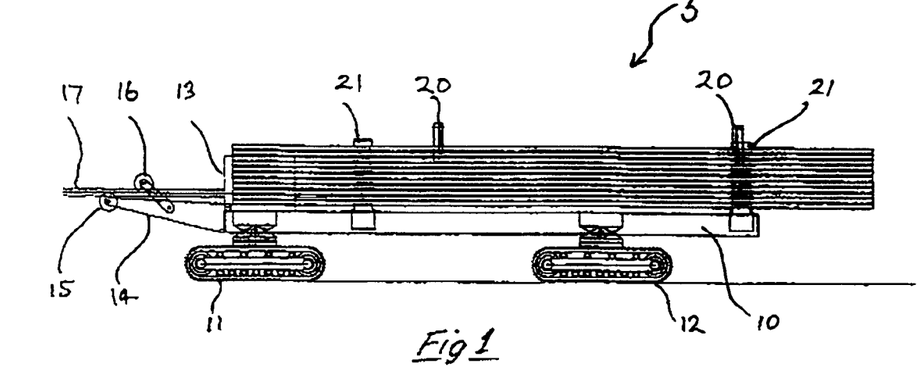
FIG. 1 shows a front elevation view of a pipe-laying vehicle according to a first embodiment of the present invention.
Figure 2:
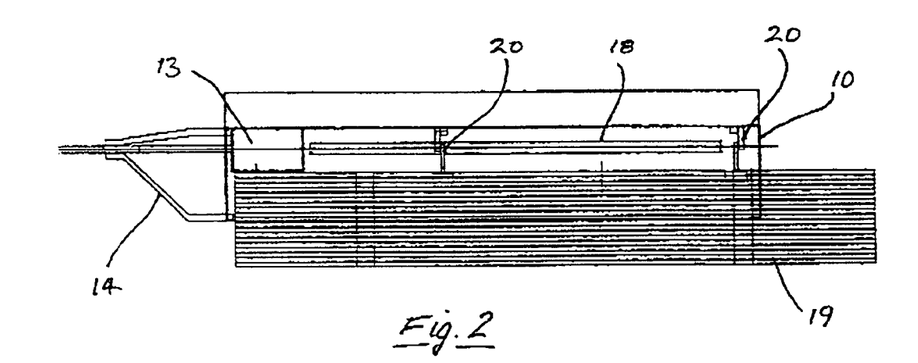
FIG. 2 is a plan view of the vehicle of FIG. 1.
Figure 3:
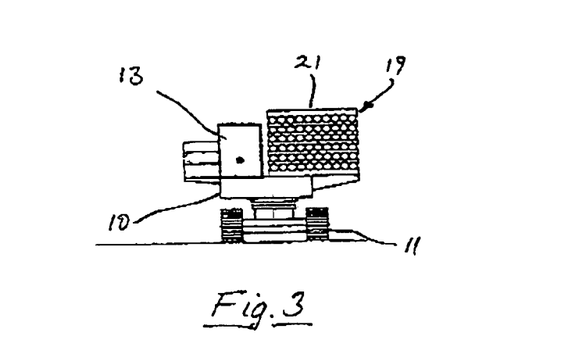
FIG. 3 is an end elevation of the vehicle of FIG. 1.

The vehicle includes a rigid platform 10 supported on twin pivoting steerable tracks 11 and 12. Mounted on the platform 10 is a welding head 13 within which the pipes to be welded are positioned in axial alignment with each other and with the longitudinal axis of the welding head (referred hereafter as a 'welding axis'). Also mounted on the platform 10 is an outrigger 14 which locates the laid pipe string 17 by means of rollers 15 and 16 to ensure correct alignment of the laid string with the welding axis.

Aligned with the welding axis is an in-feed bed 18 which receives the next pipe to be joined, and enables this pipe to be accurately aligned with the welding axis and the laid string 17. The in-feed bed 18 is provided with rollers, not shown in the drawings, which support the next pipe to be welded and enable the position of the pipe to be accurately adjusted. One or more of those rollers may be powered.

Also mounted on the vehicle is a magazine 19, containing pipes ready for laying. Pipes are moved from the magazine 19 to the in-feed bed 18 by hydraulically operated pipe handlers 20. Pipe handling can be performed by a three or more degree of freedom hydraulic, pneumatic or electrically driven mechanical device which is capable of picking the next pipe from a cartridge on the pipe-laying vehicle or from a vehicle along side the pipe-laying vehicle or from a stock pile on the 'right of way' (ROW) or from a pipe string along the ROW.

The welding head 13 includes means (not shown) for clamping the string and the next pipe, electrical connections for the supply of power to the joint, and the magnetising devices which impel the welding arc around the circumference of the joint. Also provided at the welding head is the forging system which delivers the forging force to the joint and controls the arc gap during the beating phase. This may be hydraulic, pneumatic or mechanical.

The welding head is attached to the platform 10 by means of a slide (not shown) which enables fine adjustment of the axial position of the head relative to the pipe string.

Figure 4:
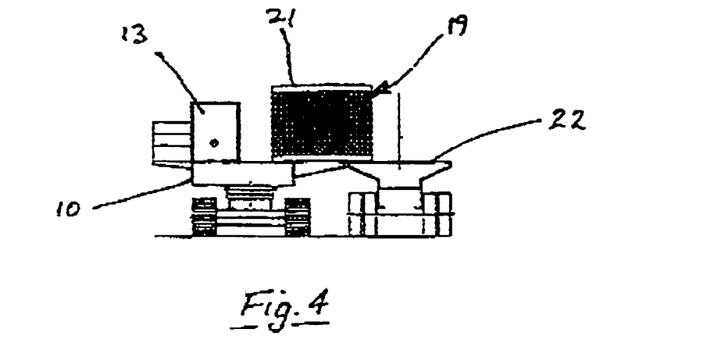
FIG. 4 illustrates a method of loading the vehicle of FIG. 1.
Figure 5:
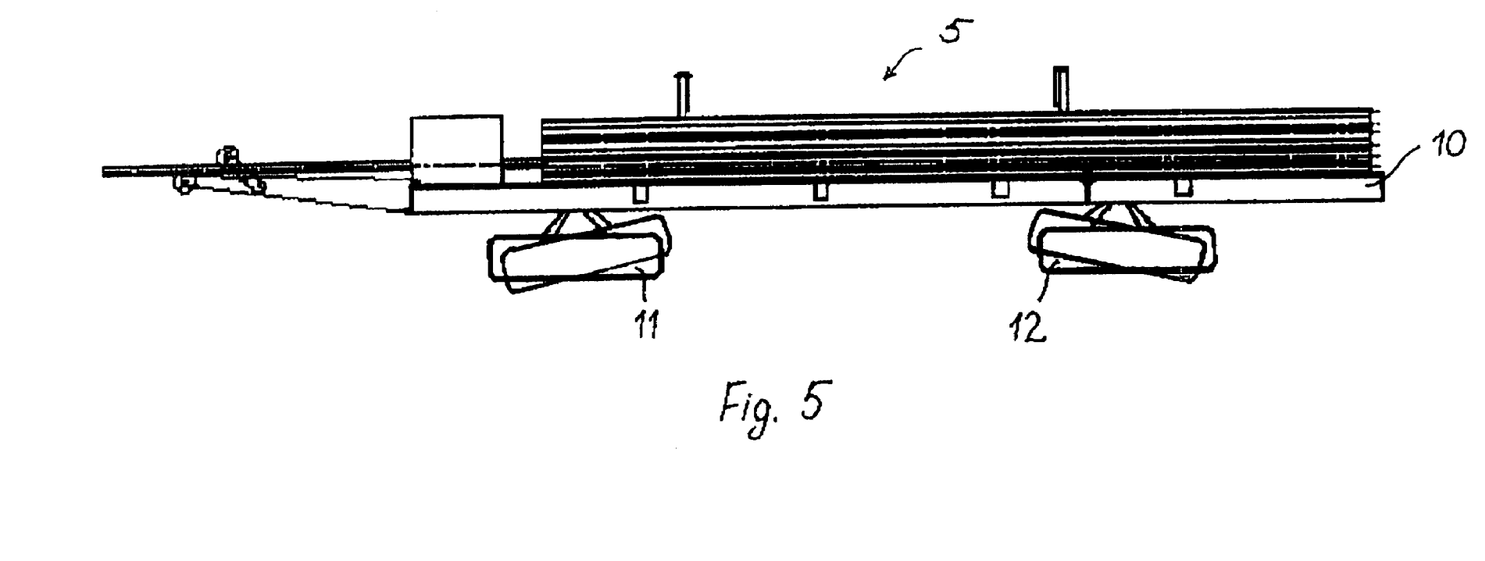
FIG. 5 illustrates tilting of tracks.

As mentioned above, pipes may be arranged in a magazine or cartridge, in which they are transported to the site. FIG. 4 shows such a magazine 19, consisting of pipes clamped between two sets of stacking bars 21, being moved from a transport jinker 22 to the platform 10.

The illustrated vehicle is capable of negotiating terrain of the various kinds found on pipeline right-of-ways without external assistance. It will be able to climb sand-hills without help from bulldozers, and cross soft or muddy ground. Manoeuvrability, stability and compactness of the pipe-laying vehicle is significantly enhanced by the provision of pivotally attached tracks 11 and 12. As can be seen from FIG. 5, each track assembly is tiltable about an axis of tilt perpendicular to the longitudinal axis of the platform 10. As a result, various configurations of the ground-engaging portion of the pipe-laying vehicle can be achieved.

Figure 6:
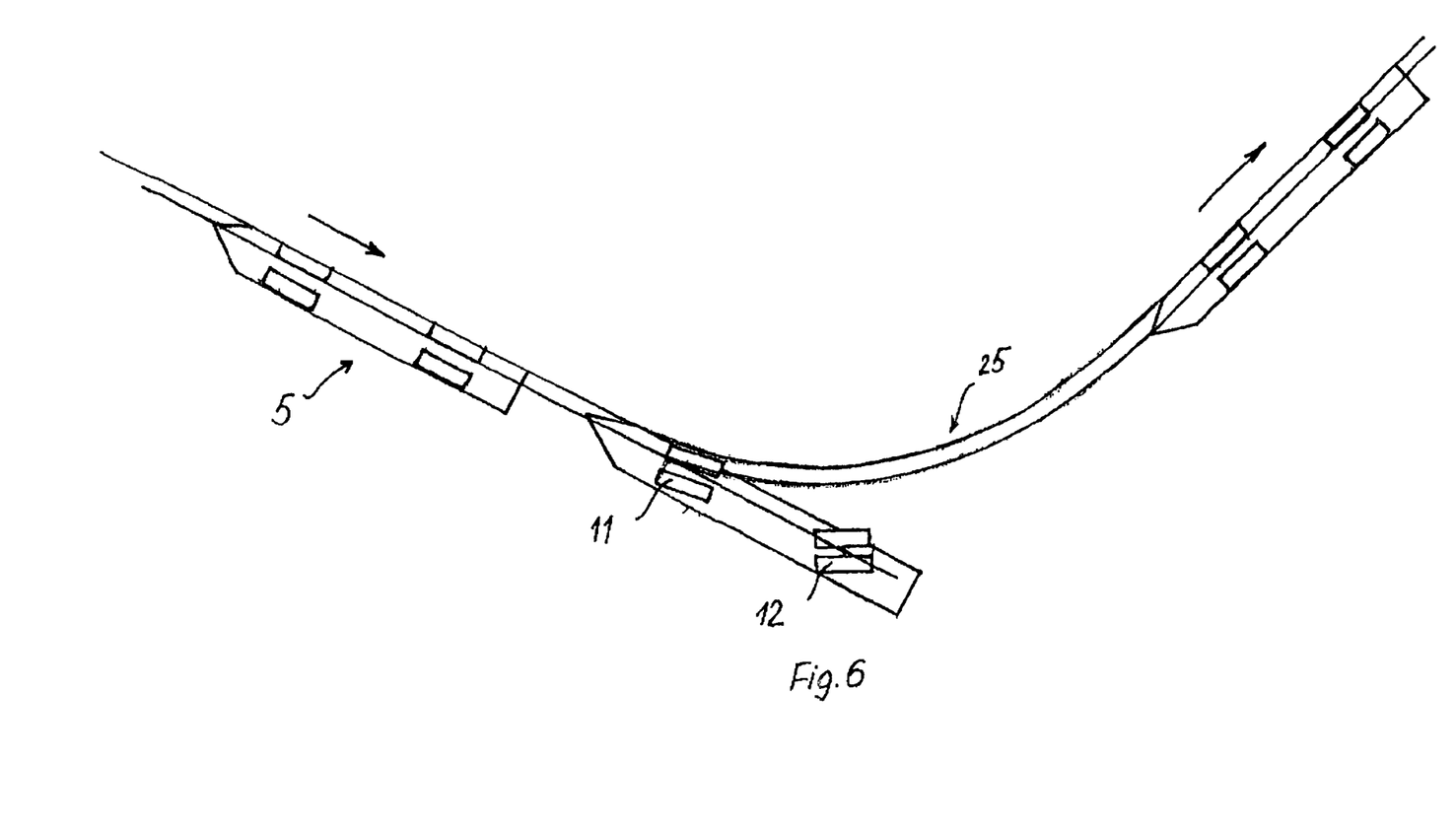
FIG. 6 shows the vehicle of FIG. 1 negotiating a trench curve.

FIG. 6 illustrates the pipe-laying vehicle 5 negotiating a trench curve 25. As shown in FIG. 6, the tracks are pivotable about a vertical axis. In a preferred embodiment, the pipe-laying vehicle includes means for differential movement of the tracks. The vehicle is steered by adjusting the speed of the track on one side of the vehicle in relation to the speed of the track on the other side. As a result, the entire vehicle can be rotated and translated through the differential movement of the tracks. Steering controls change individual track speeds through a variable speed differential or by individual motor drives. As a result, the pipe-laying vehicle may readily negotiate narrow trenches and make relatively sharp turns.

Figure 7:
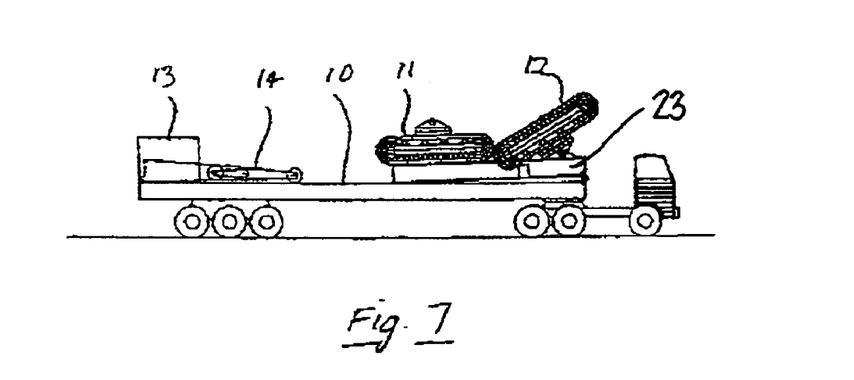
FIGS. 7 and 8 show alternative arrangements for the transport of the pipe-laying vehicle of FIG. 1.
Figure 8:
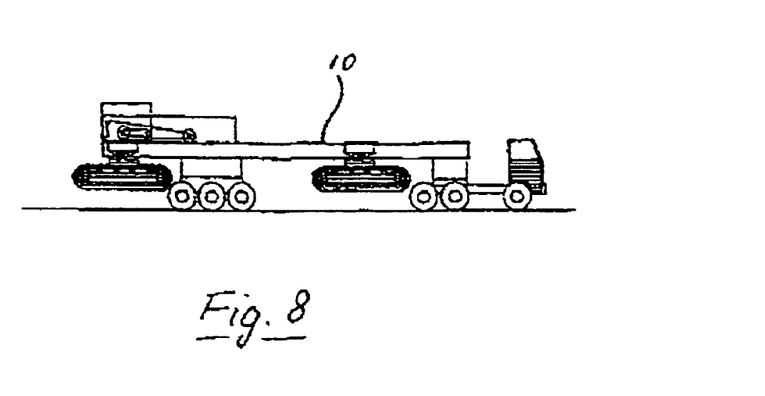

The vehicle may be transported as shown in FIG. 7 or FIG. 8. In the first of these arrangements, the platform length during transport is reduced by means of a hinged portion 23, and the outrigger 14 is hinged back onto the platform, while the tracks 11 and 12 are transported on the platform 10. In the latter arrangement, the platform is made short and narrow enough to be carried on unescorted road transport as shown, providing for the first time a vehicle capable of the functions described, yet capable of being transported on ordinary highways without escort and without delays.

In FIGS. 9 to 15 of the accompanying drawings there is illustrated a pipe-laying vehicle 30 according to a second embodiment of the present invention. The vehicle 30 includes a travelling body 35 and a rigid platform 37 rotatably supported thereon. The platform 37 is rotatable about a vertical axis by means of a hydraulic motor (not shown) or other means. In addition, the vehicle 30 includes pivotable mounting means (not shown) for tilting the platform 37 with respect to the travelling body 35. As it can be seen in FIG. 12, the axis of tilt is perpendicular to the longitudinal axis of the platform 37. The tilting of the platform is accomplished by means of a hydraulic cylinder (not shown) or other means.

Figure 9:
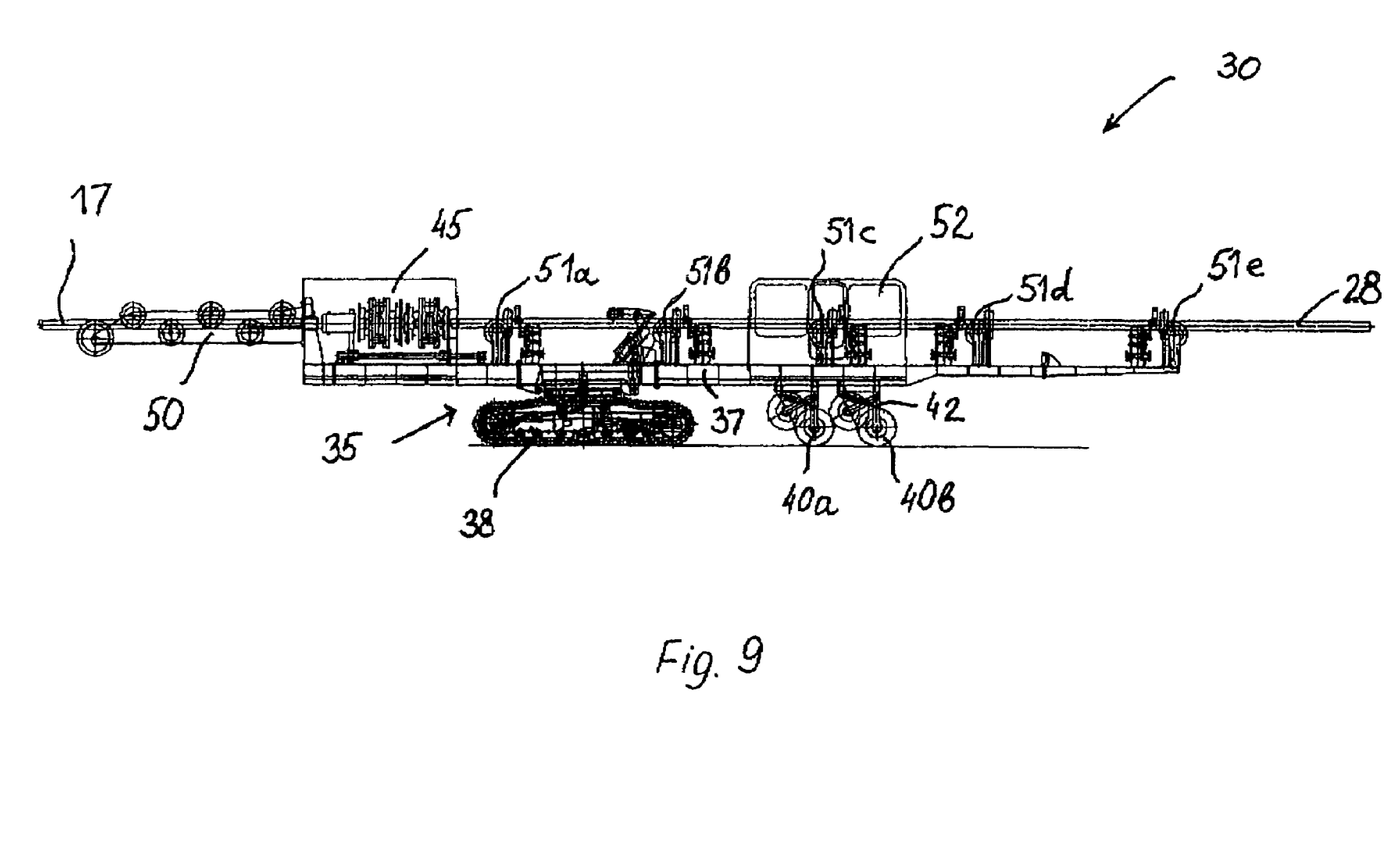
FIG. 9 is a front elevation view of a pipe-laying vehicle according to a second embodiment of the present invention.

In a preferred embodiment, the longitudinal axis of the platform 37 is parallel to the welding axis.

Figure 11:
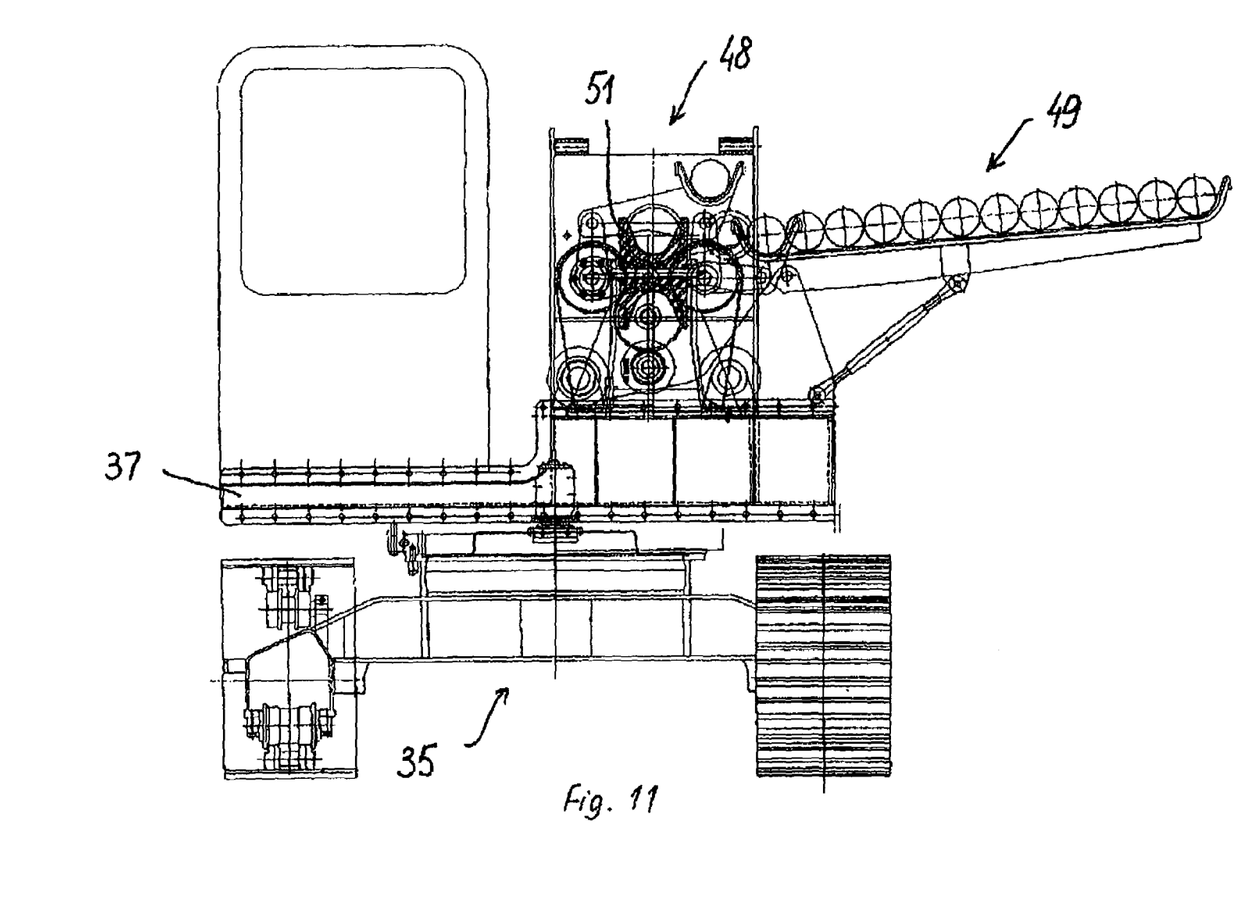
FIG. 11 is an end elevation of the vehicle of FIG. 9.
Figure 12:
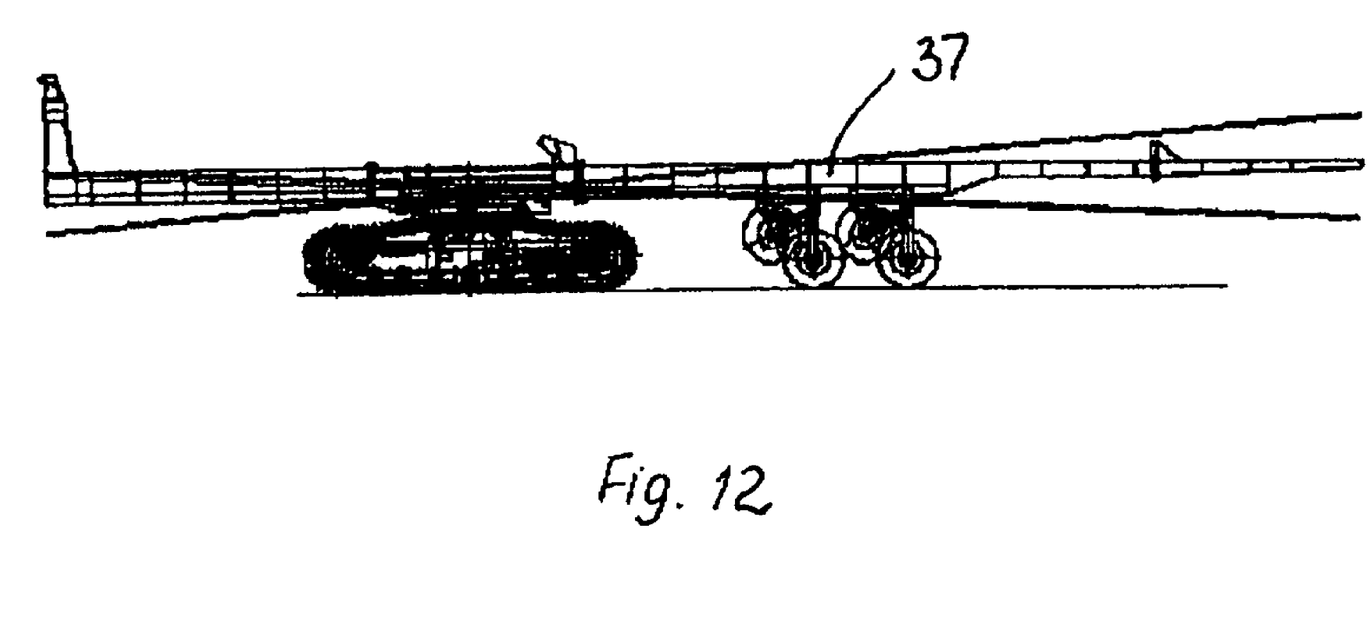
FIG. 12 illustrates tilting of the vehicle of FIG. 9.

The travelling body may be supported on trailed or driven wheels or a single or multiple sets of tracks. In a preferred embodiment, the travelling body is a self propelled vehicle supported on a single set of tracks 38. In the most preferred embodiment, the travelling body further includes two pairs of auxiliary wheels 40a and 40b spaced from the tracks 38. The auxiliary wheels may be selectively activated to provide additional support for the pipe-laying vehicle where ground conditions require it. To this end, each of the auxiliary wheels is rotatably attached to one end of a pivot arm 42, the other end of which is pivotally attached to the platform 37. In other embodiments, the pivot arm may be attached to the travelling body.

Similarly to the first embodiment, the pipe-laying vehicle is provided with means for differential movement of the tracks. The entire vehicle can be rotated or rotated and translated through the differential movement of the tracks. By reversing one track entirely the vehicle can pivot on the spot.

The main body of the pipe-laying vehicle is rotatable relative to the tracks. To this end, the main body of the vehicle is attached to the tracks through a ball bearing. For effecting the rotational movement of the main body, there is provided a hydraulic motor (not shown).

Figure 10:
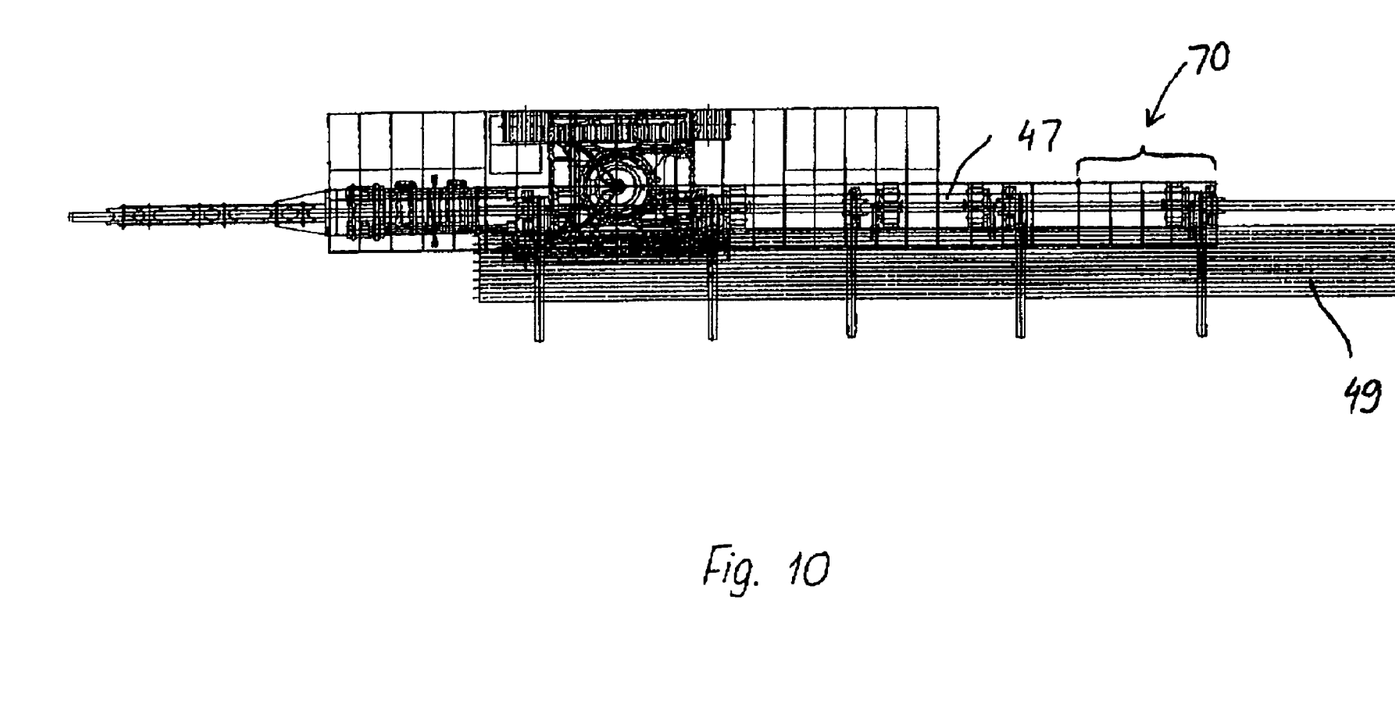
FIG. 10 is a plan view of the vehicle of FIG. 9.

In common with the first embodiment, the vehicle 30 includes a welding head 45, an in-feed bed 47, a pipe handler 48, a pipe magazine 49, and an outrigger 50. In addition, mounted on the platform 37 is an operator's cab 52 including an operator console (not shown). The welding head 45 is slidably supported with respect to the platform 37 and movable in an axial direction by a hydraulic cylinder (not shown) or other means.

Referring to FIG. 9, a full length pipe 28 of approximately 18 m is in position and entered into the welding head 45. The pipe is supported on five conveyor rolls 51a–51e. The pipe string 17 is shown leaving the rear of the pipe-laying vehicle through rear pipe guide (the outrigger) 50.

Figure 13:
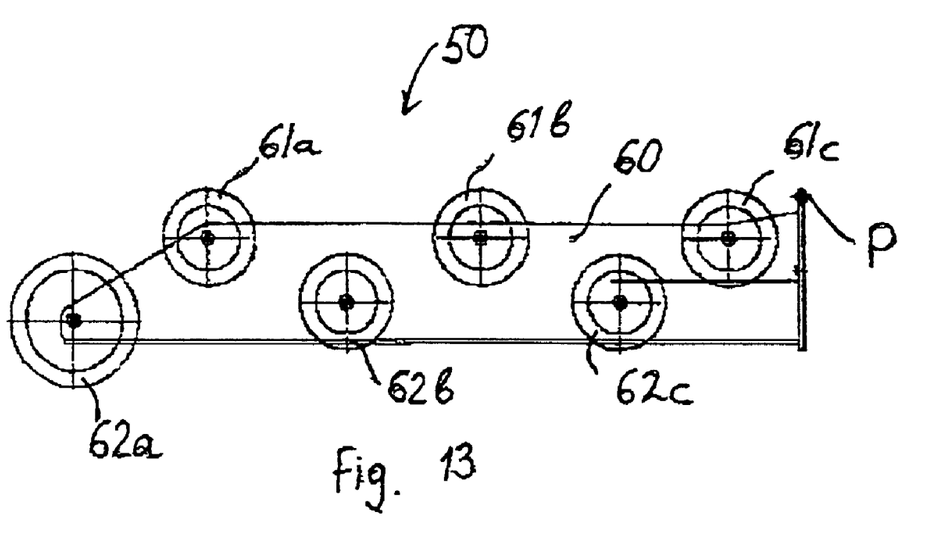
FIG. 13 is a detail of the outrigger of the vehicle of FIG. 9.
Figure 14:
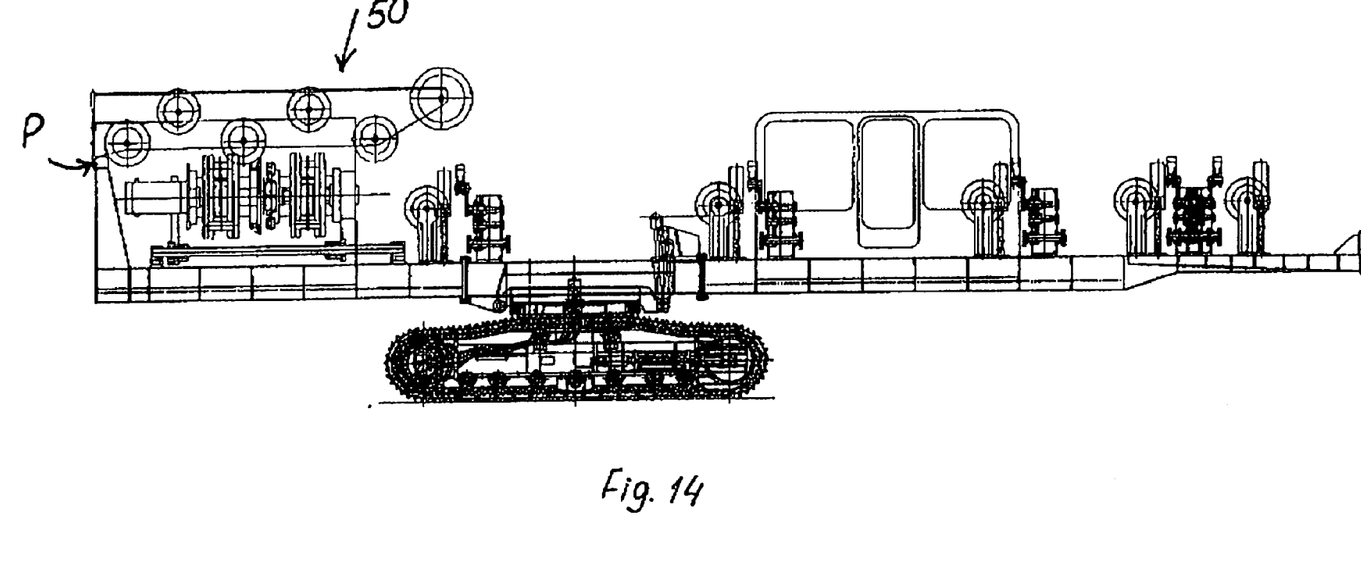
FIGS. 14 and 15 show the vehicle of FIG. 9 in a folded configuration.
Figure 15:
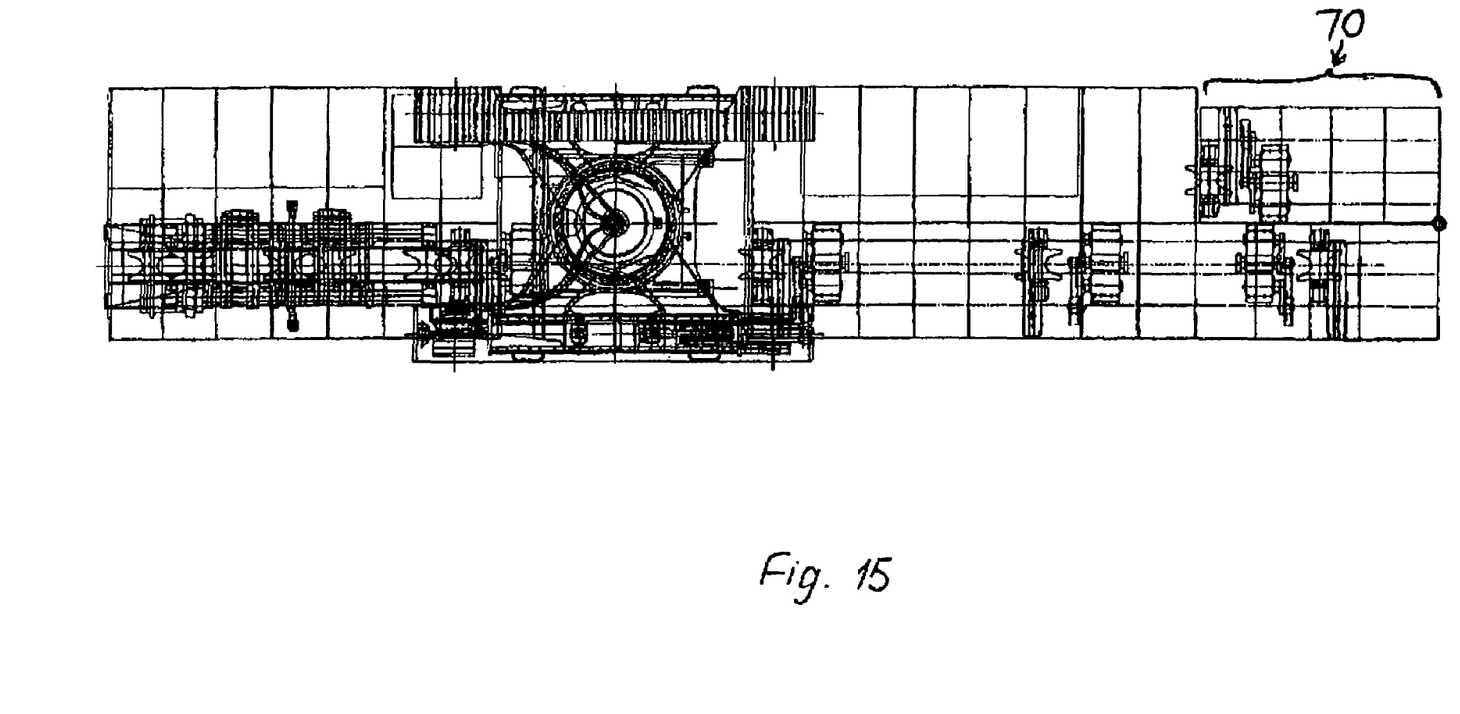

FIG. 13 is provided to illustrate a preferred embodiment of the outrigger 50. In this embodiment the outrigger 50 includes a strong and rigid structure 60 pivotally attached at P to the main body of the platform 37. Rotatably supported on the structure 60 are two spaced apart sets 61 and 62 of polymer or elastomer coated rollers. The lower set 62 supports the pipe string from below, the upper set 61 constrains it from above. The abutting portions of the rollers substantially correspond to the external profile of the pipe being processed. The placement of the sets 61 and 62 is such that the string is forced into co-axial alignment with the welding head and the next pipe.

Similarly to the first embodiment, the outrigger 50 can be hinged back onto the platform 37. In addition, the platform 37 includes a hinged front end portion 70 movable between an in-line configuration shown in FIG. 10 and a folded configuration illustrated in FIG. 15.

Referring now to FIG. 11, the pipe manipulator 48 transfers a pipe from the pipe magazine 49 and places it on the conveyor rolls 51a–51e ready for positioning in the welding head 45. The pipe magazine 49 may be loaded by a device on the pipe-laying vehicle or by a side boom tractor travelling along side the pipe-laying vehicle and picking up pipes or bundles of pipes from the right-of-way.

Quality control of the pipe joints is preferably maintained by on-line monitoring, rather than by the use of non-destructive testing. This will enable pipes being directly laid into the trench from delivery to the laying vehicle, thereby achieving significant savings in both time and personnel.

Not shown in the drawings, and variously associated with the vehicle or a separate vehicle such as a towing vehicle, are the necessary sources of electrical power, typically a diesel generator, a hydraulic power source, which may be an electrically driven single or multiple pump system, and the operator controls, including travel speed and direction control, manual and automatic weld control, pipe manipulator control, welding head fine position control. The data acquisition system monitors all the process parameters and also provides real time diagnostics for the operator.

While particular embodiments of this invention have been described, it will be evident to those skilled in the art that the present invention may be embodied in other specific forms without departing from the essential characteristics thereof. Other embodiments may include marine vessels, sub-marine vehicles, rail-based vehicles, vehicles suitable for inland water and swamp conditions, etc. The present embodiments and examples are therefore to be considered in all respects as illustrative and not restrictive, and all modifications which would be obvious to those skilled in the art are therefore intended to be embraced therein. It will further be understood that any reference herein to known prior art does not, unless the contrary indication appears, constitute an admission that such prior art is commonly known by those skilled in the art to which the invention relates.

The invention claimed is:

1. An apparatus for magnetically impelled arc butt (MIAB) welding including:
   a transportable platform;
   a MIAB welding head mounted on said transportable platform, said welding head having a welding axis;
   a pipe guide located rearwardly of said welding head and capable of engaging a welded pipe string to maintain alignment of said string with said welding axis, said pipe guide being mounted on said transportable platform;
   pipe feed means maintaining alignment of a next pipe to be laid with the welding axis and the pipe string; and
   a travelling body, wherein said transportable platform is rotatably mounted on said travelling body, and having a substantially vertical axis of rotation.

2. An apparatus according to claim 1, wherein:
   said transportable platform includes an outrigger means extending rearwardly of said transportable platform, said pipe guide being mounted on said outrigger means.

3. An apparatus according to claim 1, further including:
   means for the transfer of a pipe from a pipe supply to the pipe feed means, said feed means including an in-feed bed holding the next pipe to be welded in alignment with the welding axis and the welded string, said in-feed bed being mounted on said transportable platform.

4. An apparatus according to claim 3, wherein:
   said pipe supply includes a pipe magazine, said pipe magazine being mounted on said transportable platform.

5. An apparatus according to claim 1, further comprising:
   pivotable mounting means for tilting said transportable platform relative to said travelling body.

6. An apparatus according to claim 5, wherein:
   the axis of tilt is perpendicular to the welding axis.

7. An apparatus according to claim 5, wherein:
   said travelling body includes a tracked support having a direction of travel and said axis of tilt is perpendicular to said direction.

8. An apparatus according to claim 1, wherein:
   said travelling body is rotatable about a substantially vertical axis of rotation.

9. An apparatus according to claim 1, wherein:
   said travelling body includes a main body and a tracked support, said main body being rotatable in relation to said tracked support.

10. An apparatus according to claim 1, wherein:
    said travelling body includes at least a pair of tracks for respective sides of said body.

11. An apparatus according to claim 10, further comprising:
    means for differential movement of said tracks.

12. An apparatus according to claim 10, further comprising:
    at least a set of auxiliary wheels for supporting said pipe-laying vehicle, said set of auxiliary wheels being spaced from said tracks, each of said auxiliary wheels being rotatably mounted to a pivot arm thereby permitting movement of the auxiliary wheels.

13. An apparatus according to claim 1, wherein:
    said travelling body includes an undercarriage, a front pair of tracks and a rear pair of tracks, said travelling body having a longitudinal axis, each said track being pivotally mounted to said undercarriage thereby permitting tilting movement of each track about an axis of tilt perpendicular to the longitudinal axis of said travelling body.

14. An apparatus according to claim 13, wherein:
said longitudinal axis is parallel to the welding axis.

15. An apparatus according to claim 13, wherein:
said travelling body includes at least a pair of steerable tracks and a steering mechanism operatively connected to said steerable tracks for steering the pipe-laying vehicle.

16. An apparatus according to claim 13, further comprising:
means for differential movement of said tracks.

17. An apparatus according to claim 1, wherein:
said transportable platform includes an outrigger.

18. An apparatus according to claim 1, wherein:
said transportable platform includes an end portion and a body portion, said end portion being hingedly attached to said body portion so as to be movable between an in-line configuration in which the portions are arranged substantially in line with each other along a longitudinal axis of said transportable platform and a folded configuration in which said portions are arranged in an overlaying relation with each other.

19. An apparatus according to claim 18, wherein:
said pipe guide is mounted on said end portion.

20. An apparatus according to claim 18, wherein:
said end portion includes an outrigger.

21. An apparatus according to claim 1, wherein:
said transportable platform includes an end portion and a body portion, said end portion being hingedly attached to said body portion so as to be movable between an in-line configuration in which the portions are arranged substantially in line with each other along a longitudinal axis of said transportable platform and a folded configuration in which said portions are arranged side by side parallel to the longitudinal axis of said transportable platform.

22. An apparatus according to claim 1, wherein:
said pipe guide includes rollers acting to align said pipe string co-axially with the welding axis.

23. An apparatus according to claim 22, wherein:
each said roller has a profile substantially corresponding to the shape of said pipe string.

24. An apparatus for magnetically impelled arc butt (MIAB) welding including:
a transportable platform;
a MIAB welding head mounted on said transportable platform, said welding head having a welding axis;
a pipe guide located rearwardly of said welding head and capable of engaging a welded pipe string to maintain alignment of said string with said welding axis, said pipe guide being mounted on said transportable platform;
a pipe feeder adapted to maintain alignment of a next pipe to be laid with the welding axis and the pipe string; and
a travelling body, wherein said transportable platform is rotatably mounted on said travelling body, and having a substantially vertical axis of rotation.

25. An apparatus according to claim 24, further comprising:
pivotable mounting means for tilting said transportable platform relative to said travelling body.

* * * * *